US011807803B1

(12) United States Patent
Wagle et al.

(10) Patent No.: US 11,807,803 B1
(45) Date of Patent: Nov. 7, 2023

(54) CEMENT SPACER FLUID WITH POLYETHYLENEIMINE HYDROCHLORIDE SALT AS A SHALE INHIBITOR

(71) Applicant: Saudi Arabian Oil Company, Dhahran (SA)

(72) Inventors: Vikrant Wagle, Abqaiq (SA); Ali Mohammed Hussain Al Safran, Dhahran (SA); Abdullah Saleh Hussain Al-Yami, Dhahran (SA); Omprakash Pal, Dhahran (SA); Sara Abdulaziz Alkhalaf, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/816,865

(22) Filed: Aug. 2, 2022

(51) Int. Cl.
*C09K 8/40* (2006.01)
*E21B 33/16* (2006.01)
*C09K 8/46* (2006.01)
*C09K 8/42* (2006.01)

(52) U.S. Cl.
CPC ............... *C09K 8/40* (2013.01); *C09K 8/424* (2013.01); *C09K 8/46* (2013.01); *E21B 33/16* (2013.01)

(58) Field of Classification Search
None
See application file for complete search history.

(56) References Cited

U.S. PATENT DOCUMENTS

| | | | |
|---|---|---|---|
| 2,761,843 A | 9/1956 | Brown | |
| 3,878,895 A * | 4/1975 | Wieland | E21B 33/16 166/291 |
| 4,493,771 A | 1/1985 | Wilson et al. | |
| 4,515,708 A | 5/1985 | Haslegrave et al. | |
| 4,717,488 A | 1/1988 | Seheult et al. | |
| 5,057,467 A | 10/1991 | Croft | |
| 5,558,171 A | 9/1996 | McGlothlin et al. | |
| 5,593,953 A | 1/1997 | Malchow, Jr. | |
| 5,641,385 A | 6/1997 | Croft et al. | |
| 6,153,049 A | 11/2000 | Croft | |
| 6,312,560 B1 | 11/2001 | Croft | |
| 6,823,940 B2 | 11/2004 | Reddy et al. | |
| 7,287,593 B2 | 10/2007 | Hutchins et al. | |
| 7,776,798 B2 | 8/2010 | Subramanian et al. | |
| 7,863,228 B2 | 1/2011 | Loper et al. | |
| 7,939,470 B1 | 5/2011 | Wagle et al. | |
| 8,936,111 B2 | 1/2015 | Maghrabi et al. | |
| 8,950,492 B2 | 2/2015 | Maghrabi et al. | |
| 9,127,192 B2 | 9/2015 | Maghrabi et al. | |
| 9,296,937 B2 | 3/2016 | Wagle et al. | |

(Continued)

FOREIGN PATENT DOCUMENTS

| | | |
|---|---|---|
| WO | WO 2014123709 | 8/2014 |
| WO | WO 2014200671 | 12/2014 |
| WO | WO 2015031270 | 3/2015 |

OTHER PUBLICATIONS

U.S. Appl. No. 17/850,363, filed Jun. 27, 2022, Wagle et al.

(Continued)

*Primary Examiner* — Andrew Sue-Ako
(74) *Attorney, Agent, or Firm* — Fish & Richardson P.C.

(57) ABSTRACT

A cement spacer fluid and a method for making and a method for using the cement spacer fluid are provided. The cement spacer fluid includes a polyethyleneimine hydrochloride (PEI HCl) salt, an aqueous solvent, a viscosifier, and a weighting agent.

11 Claims, 6 Drawing Sheets

(56) References Cited

U.S. PATENT DOCUMENTS

| | | |
|---|---|---|
| 9,296,941 B2 | 3/2016 | Wagle et al. |
| 9,346,995 B2 | 5/2016 | Wagle et al. |
| 9,434,911 B2 | 9/2016 | Bennett et al. |
| 9,469,803 B2 | 10/2016 | Wagle et al. |
| 9,518,206 B2 | 12/2016 | Maghrabi et al. |
| 9,650,559 B2 | 5/2017 | Nelson |
| 9,796,907 B2 | 10/2017 | Wagle et al. |
| 9,884,985 B2 | 2/2018 | Al-Subhi et al. |
| 9,951,261 B2 | 4/2018 | Nelson |
| 9,988,569 B2 | 6/2018 | Wagle et al. |
| 10,030,189 B2 | 7/2018 | Wagle et al. |
| 10,214,675 B2 | 2/2019 | Wagle et al. |
| 10,457,847 B2 | 10/2019 | Wagle et al. |
| 10,480,278 B1 | 11/2019 | Sodhi et al. |
| 10,570,326 B2 | 2/2020 | Wagle et al. |
| 11,286,412 B2 | 3/2022 | Amanullah et al. |
| 11,492,536 B2 | 11/2022 | Alkhalaf et al. |
| 2014/0296113 A1* | 10/2014 | Reyes ................... C09K 8/74 510/109 |
| 2015/0144339 A1* | 5/2015 | Vladimirovich ......... C09K 8/92 166/280.2 |
| 2016/0208158 A1 | 7/2016 | Monahan et al. |
| 2020/0071602 A1* | 3/2020 | Dhawan ................ C04B 24/123 |
| 2022/0259486 A1 | 8/2022 | Alkhalaf et al. |
| 2022/0363971 A1* | 11/2022 | Alkhalaf ................. C09K 8/40 |

OTHER PUBLICATIONS

U.S. Appl. No. 17/850,368, filed Jun. 27, 2022, Wagle et al.
U.S. Appl. No. 17/879,215, filed Aug. 2, 2022, Wagle et al.
An et al., "A strong inhibition of polyethyleneimine as shale inhibitor in drilling fluid," Journal of Petroleum Science and Engineering, Feb. 2018, 161:1-8, 8 pages.
Guancheng et al., "Polyethyleneimine as shale inhibitor in drilling fluid," Applied Clay Science, Jul. 2016, 127-128:70-77, 8 pages.
Maxey, "Rheological Analysis of Static and Dynamic Sag in Drilling Fluids," Annual Transactions Of The Nordic Rheology Society, 15:181, 2007, 8 pages.

* cited by examiner

CEMENT SPACER FLUID WITH POLYETHYLENEIMINE HYDROCHLORIDE SALT AS A SHALE INHIBITOR

TECHNICAL FIELD

The present disclosure is directed to the use of cement in wells that have shale, or other hydratable materials.

BACKGROUND

The production of crude oil and gas generally involves placing cement, for example, around casing in a wellbore, as part of the well completion. Good cementing plays an essential role in oil and gas wells. It has various and important functions such as providing good wellbore integrity, supporting the vertical and radial loads applied to the casing, isolating the formations from the producing zone. A failed cement job and subsequent loss of zonal isolation can have a negative effect at the cement-formation interface, in the bulk cement and at the casing-cement interface.

Spacer fluids are very important during cementing operation in order to have good cement bonding and ensure integrity of the wellbore. The main functions of a spacer fluid are to separate the cement slurry from the drilling fluid, to assist in displacement of the drilling fluid, and to condition the walls of the wellbore for effective cement bonding.

During the cement displacement process, the spacer contacts the walls of the wellbore. When a spacer fluid contacts a shale formation it may cause swelling of the shale thereby resulting in poor cement bonding. The shale formation may be protected by preventing or minimizing the hydration process by adding an appropriate shale inhibitor to the spacer fluid.

SUMMARY

An embodiment described in examples herein provides a method for cementing in a wellbore. The method includes making a cement spacer fluid by reacting a polyethyleneimine (PEI) with hydrochloric acid to form a polyethyleneimine hydrochloride (PEI HCl) salt, dissolving the PEI HCl salt in water to form a PEI HCl salt solution, and forming the cement spacer fluid from the PEI HCl salt solution. A cement slurry is then made. The cement spacer fluid is injected in a wellbore. The cement slurry is injected in the wellbore and allowed to set.

Another embodiment described in examples herein provides a cement spacer fluid for cementing a wellbore. The cement spacer fluid includes a polyethyleneimine hydrochloride (PEI HCl) salt, an aqueous solvent, a viscosifier, and a weighting agent.

Another embodiment described in examples herein provides a method for making a cement spacer fluid composition. The method includes reacting a polyethyleneimine (PEI) with hydrochloric acid to form a polyethyleneimine hydrochloride (PEI HCl) salt, dissolving the PEI HCl salt in water to form a PEI HCl salt solution, mixing the PEI HCl salt solution with a viscosifier to form a thickened solution, and mixing the thickened solution with a weighting agent.

DETAILED DESCRIPTION

Shale inhibitors are often added to aqueous compositions used in well drilling and completion operations to avoid problems with hydration of shale layers. For example, potassium chloride is often added to aqueous compositions to inhibit water adsorption and collapse of shale layers.

Compositions and methods provided herein describe the synthesis and use of a high molecular weight polyethyleneimine hydrochloride (PEI HCl) salt as a shale inhibitor for a cement spacer fluid. The PEI HCl salt has the general structure:

where x is 3, 4, 5, or higher. In some embodiments, x is 100. A comparison of a conventional potassium chloride shale inhibitor with the PEI HCl salt indicates that the PEI HCl salt has a higher performance as a shale inhibitor as compared to a potassium chloride shale inhibitor.

Figure 1A:
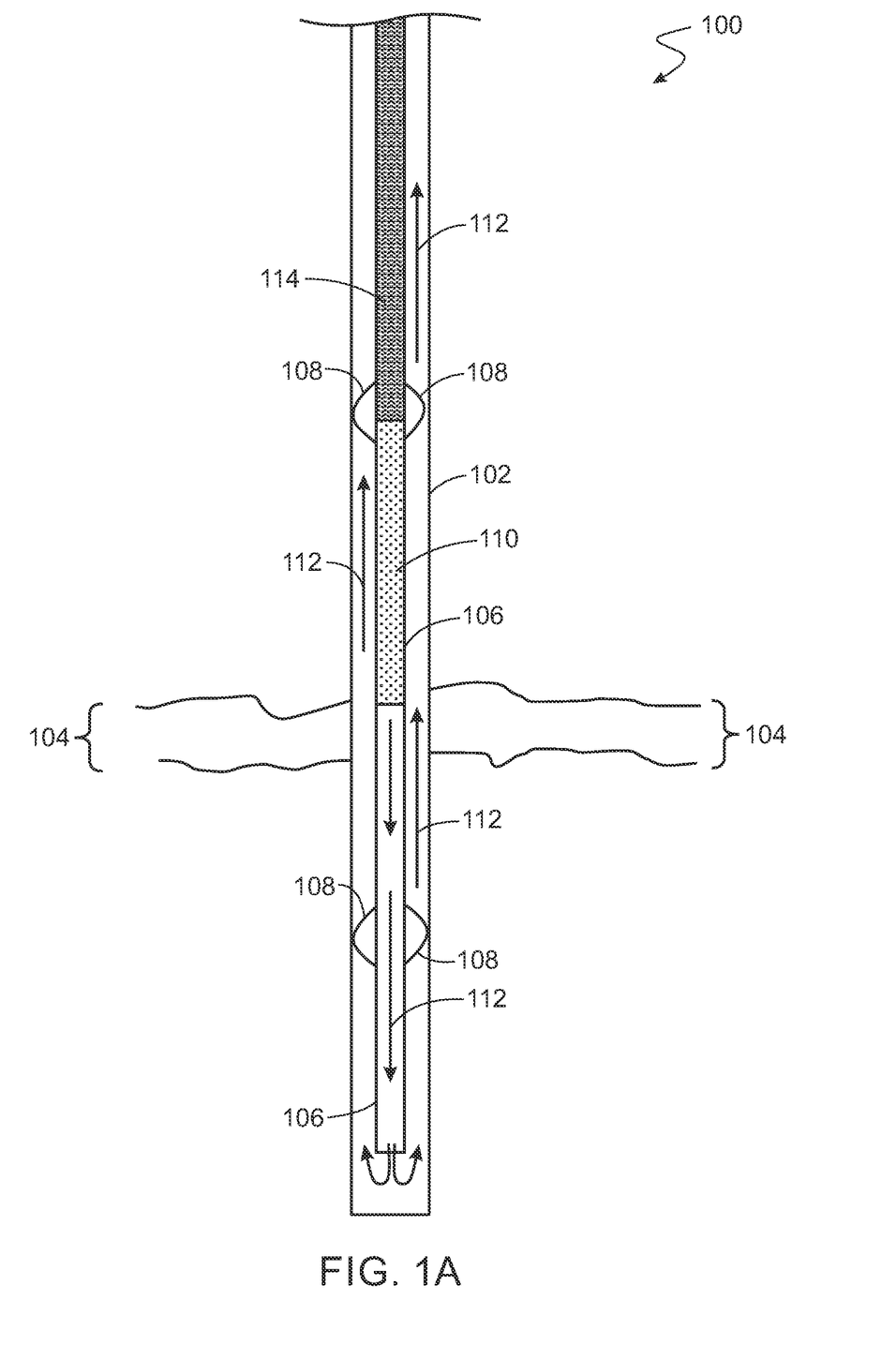
FIGS. 1A and 1B are schematic drawings of a cementing operation in a wellbore that has a shale layer.
Figure 1B:
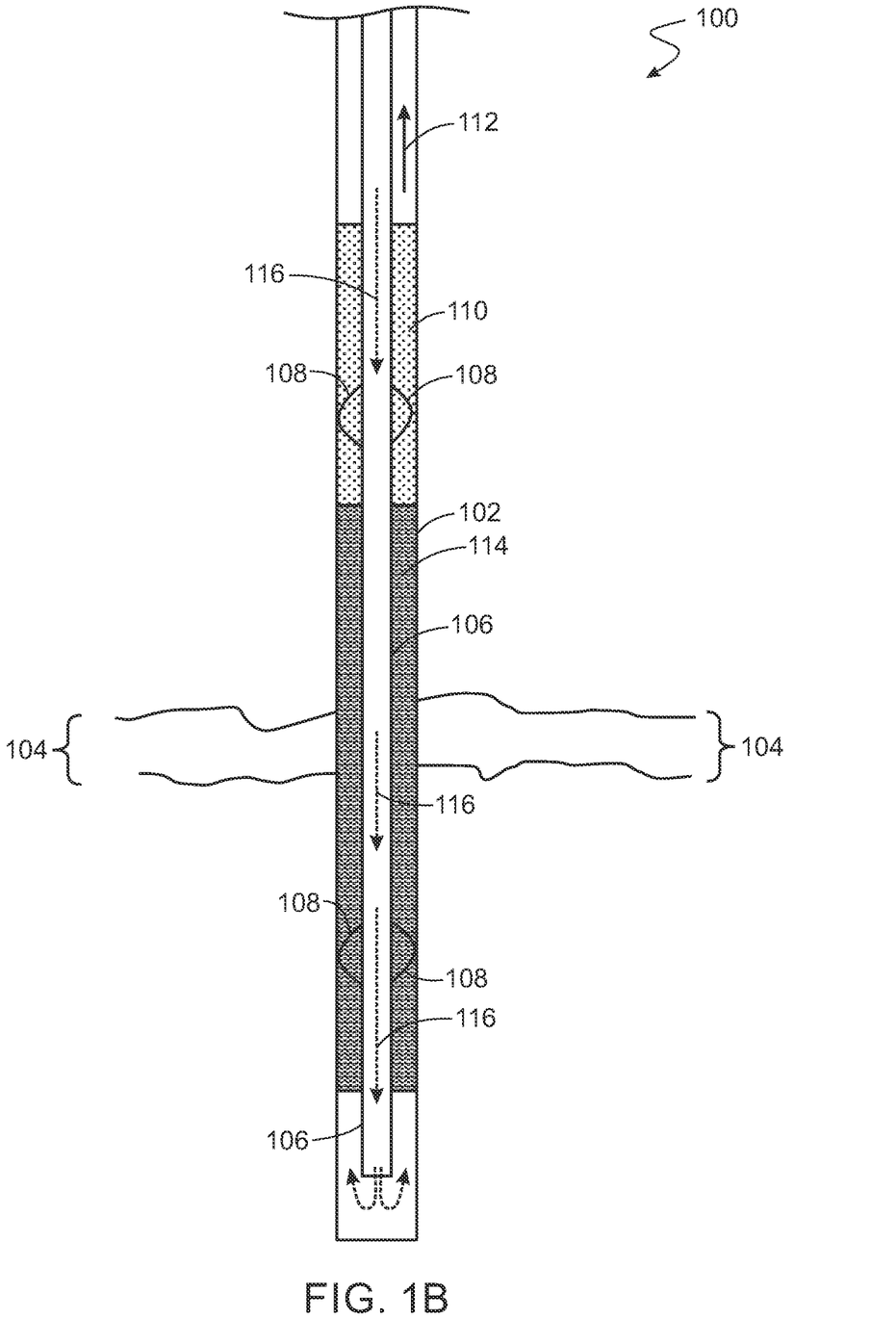

FIGS. 1A and 1B are schematic drawings of a cementing operation 100 in a wellbore 102 that has a shale layer 104. In this example, a casing tubular 106 is placed inside the wellbore 102. The proportions of the casing tubular 106 and the wellbore 102 are not shown to scale to make it easier to see the cementing operation 100. Further, other devices may be used in addition to, or in place of, the devices shown in this example. For example, the downhole end of the casing tubular 106 may have a shoe, or device with a rounded end, to direct the casing tubular 106 down the wellbore 102, while preventing the casing tubular 106 from getting caught on the rough walls of the wellbore 102.

Centralizers 108 are generally used to center the casing tubular 106 in the wellbore 102. Once the casing tubular 106 is in place, the cementing job is performed. For example, a cement spacer fluid 110 is injected into the casing tubular 106 to separate the drilling mud 112 from the cement slurry 114 that is injected. The cement spacer fluid 110 is generally used as the cement slurry 114 is often not compatible with the drilling mud 112, and would form a gel at the interface between the drilling mud 112 and the cement slurry 114. For example, the drilling mud 112 may be an invert emulsion that has a non-aqueous continuous phase. In contrast, the cement spacer fluid 110 and the cement slurry 114 are generally aqueous, and may hydrate the shale layer 104 causing a portion of the surface to swell and flake off into the wellbore 102. The shale inhibitors described herein may mitigate this problem.

As shown in FIG. 1B, the cement spacer fluid 110, followed by the cement slurry 114, exits the casing tubular 106 and moves up the annulus between the casing tubular 106 and the wellbore 102. A displacement fluid 116 is used to force the cement out of the casing tubular 106 and into the annulus. The displacement fluid 116 may be an aqueous fluid with a composition similar to the spacer fluid. In some embodiments, a displacement fluid 116 is not used, and an elastomeric plug, termed a wiper plug, is used to force the cement slurry 114 out of the casing tubular 106.

Figure 2:
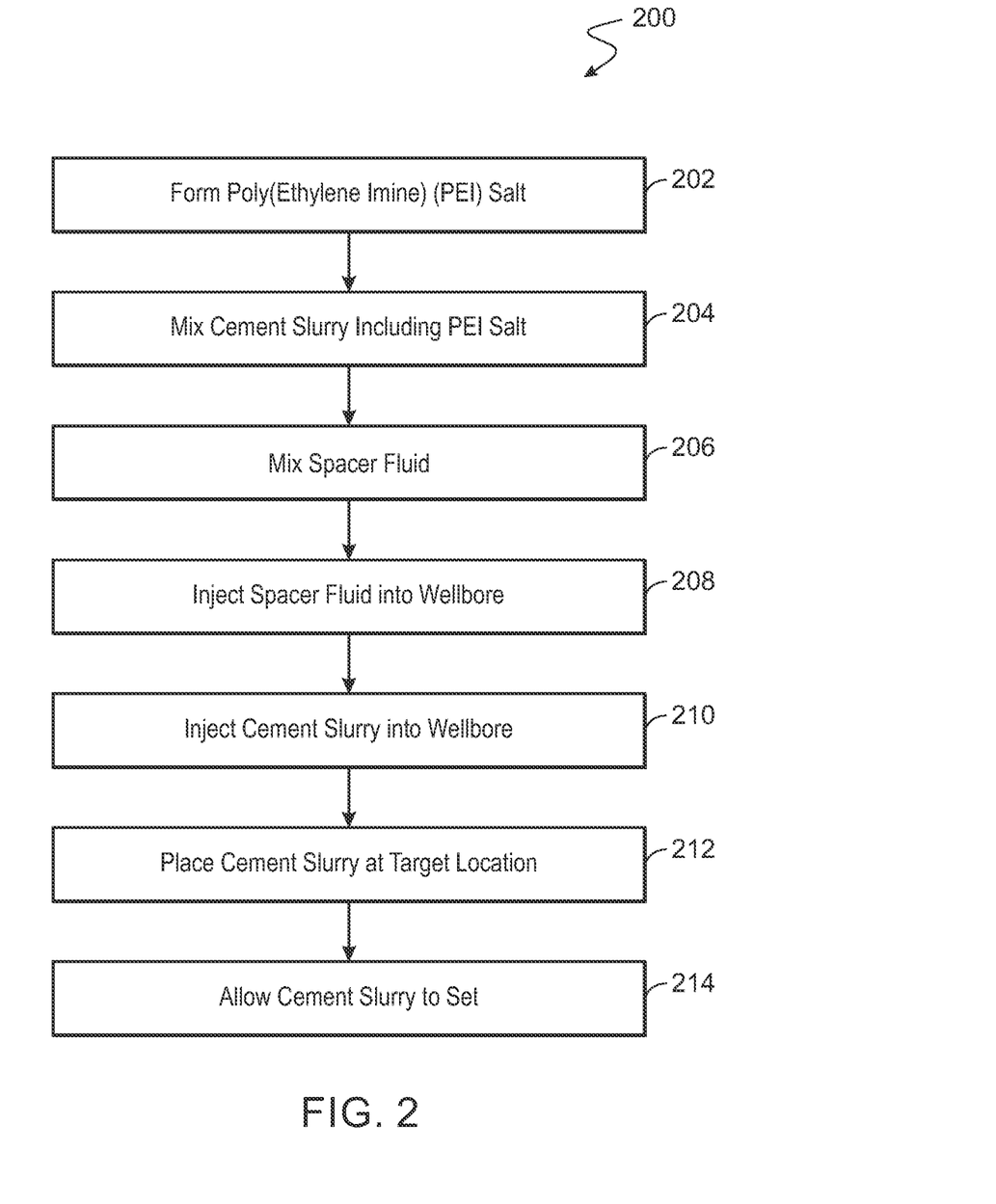
FIG. 2 is a process flow diagram of a method for performing a cementing operation using a polyethyleneimine hydrochloride (PEI HCl) salt as a shale inhibitor in the cement spacer fluid.
Figure 3A:
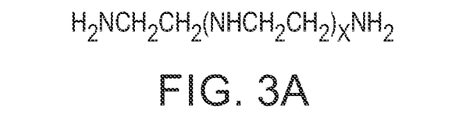
FIGS. 3A to 3E are examples of PEI structures that may be used to form PEI HCl salts for shale inhibitors.
Figure 3B:
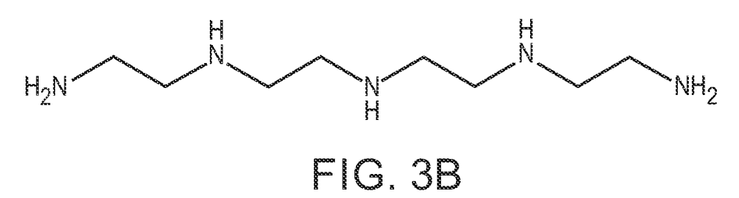
Figure 3C:
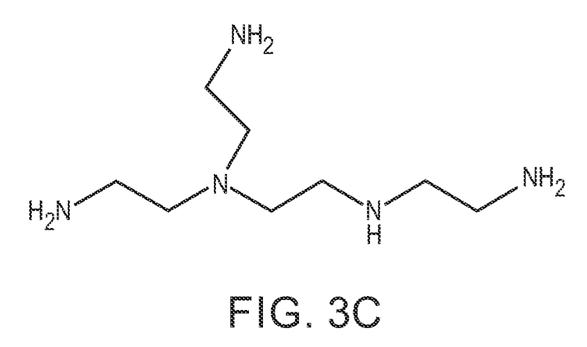
Figure 3D:
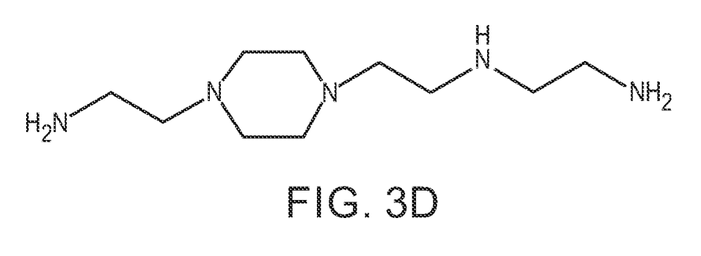
Figure 3E:
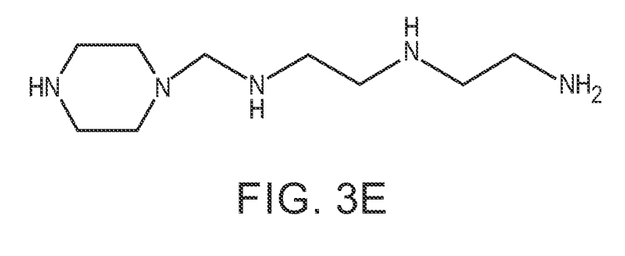

FIG. 2 is a process flow diagram of a method 200 for performing a cementing operation using a polyethyleneimine hydrochloride (PEI HCl) salt as a shale inhibitor in the cement spacer fluid. The method 200 starts at block 202 with the formation of the PEI HCl salt. This is performed by reacting a PEI, for example, as shown in FIGS. 3A-3E, with concentrated hydrochloric acid. The reaction is performed as described with respect to FIG. 4A, with a resulting general structure as shown in FIG. 4B. The reaction may be allowed to proceed to a targeted pH, such as 7.0, 7.5, and the like, or a stoichiometric amount of HCl may be used relative to the nitrogen atoms in the PEI.

At block 204, a cement slurry is formed. In some embodiments, the cement slurry may include a shale inhibitor. The shale inhibitor used may include the PEI HCl salts described herein.

At block 206, the spacer fluid is prepared. The spacer fluid may be an aqueous fluid, for example, including a shale inhibitor, an antifoaming agent, and the like. In some embodiments, the spacer fluid includes the PEI HCl salt as a shale inhibitor. As described further with respect to the examples, this may be performed by mixing the PEI HCl salt with water and other materials, such as viscosifiers, defoaming agents, and the like. The PEI HCl salt makes up about 0.5 wt. % to about 25 wt. % of the cement spacer fluid. In some embodiments, a viscosifier makes up about 0.1 wt. % to about 10 wt. % of the cement spacer fluid. In some embodiments, a weighting agent makes up about 0.1 wt. % to about 80 wt. % of the cement spacer fluid. The weighting agent may be barite, hematite, or low gravity solids, such as RevDust™ from Halliburton Co. of Duncan, Okla., USA.

At block 208, the spacer fluid is injected into the casing tubular to force out drilling mud. The spacer fluid injection may be after other fluids that are injected before the spacer fluid, such as a chemical wash to clean the surfaces of the wellbore in preparation for the cementing.

At block 210, the cement slurry is injected into the wellbore after the spacer fluid. In some embodiments, the cement slurry is separated from the spacer fluid by a wiper plug.

At block 212, the cement slurry is placed at the target location, for example, overlapping the centralizers and filling the annulus between the wellbore and the casing tubular. The amount of cement slurry injected may be determined by the volume of the annulus between the tubular casing and the wellbore.

At block 214, the cement slurry is allowed to set. Once the cement surrounding the first casing tubular has set, drilling of the wellbore may continue. Once a target distance is reached, for example, 500 m, 1000 m, or longer depending on the structure of the subsurface layers and aquifers, a smaller diameter casing tubular is inserted. The cementing is then repeated to place cement in the annulus between the smaller casing tubular and the wellbore, and in the annulus between the smaller casing tubular and the first casing tubular.

Examples

Synthesis of Polyethyleneimine Hydrochloride (PEI HCl) Salt

The polyethyleneimine (PEI) tested was ethylene amine E-100, obtained from Arabian Amines Company of Jubail Industrial City, Saudi Arabia. E-100 is a complex mixture of various linear, cyclic, and branched products with a number-average molecular weight of 250-300 g/mole with the general structure shown in FIG. 3A. In FIG. 3A, x is 3, 4, 5, or higher. For example, E-100 may include tetraethylenepentamine (TEPA), pentaethylenehexamine (PEHA), hexaethylene-heptamine (HEHA), and higher molecular weight products. Once of the primary constituents of E-100 is tetraethylenepentamine, which has the structure shown in FIG. 3B. Other TEPA isomers may also be present, such as AETETA (4-(2-aminoethyl)-N-(2-aminoethyl)-N'-{2-{(2-aminoethyl)amino}ethyl}-1,2-ethanediamine), shown in FIG. 3C, AEPEEDA (1-(2-aminoethyl)-4-[(2-aminoethyl)-amino]ethyl]-piperazine), shown in FIG. 3D, and PEDETA (1-[2-[[2-[(2-aminoethyl)amino]ethyl]-amino]ethyl]-piperazine), shown in FIG. 3E.

Figure 4A:
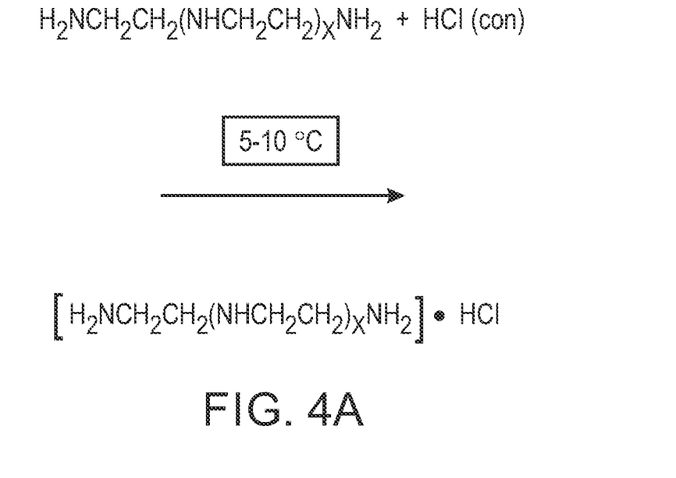
FIG. 4A is a schematic diagram of a reaction for forming a PEI HCl salt.
Figure 4B:
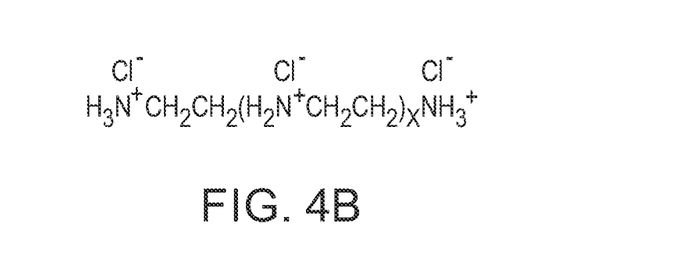
FIG. 4B is a structural diagram of a PEI HCl salt.

FIG. 4A is a schematic diagram of a reaction scheme for forming a PEI HCl salt. As shown in the reaction scheme, the PEI is reacted with concentrated HCl at a reduced temperature. For example, 133 ml of E-100 was placed in a beaker. The beaker was kept at a temperature between 5-10° C. in an ice water bath. 130 ml of 12.1N concentrated hydrochloric acid was added to the polyamine in increments of 0.5 ml with constant stirring, for example, using a glass rod. The HCl (con) was continuously added until the pH of the PEI HCl salt solution reached 7.5. At the end of the HCl addition, a 68-70% w/w aqueous solution of PEI HCl salt was obtained. The PEI HCl salt obtained may have the general structure shown in FIG. 4B. In FIGS. 4A and 4B, x is 3, 4, 5, or higher.

Performance of PEI HCl salt based shale inhibitor in cement spacer fluids.

The performance of PEI HCl salt as a shale inhibitor in a cement spacer fluid was evaluated by performing two tests, including a hydration suppression test, and a shale erosion test.

Hydration Suppression Test.

Reactive shales in contact with cement tend to swell as they are susceptible to hydration. Shale inhibitors tend to suppress the hydration, thereby preventing the swelling of the shale. Thus, to check the efficacy of the PEI HCl salt as a shale inhibitor, hydration suppression tests were performed using bentonite clay as a model of the shale.

Bentonite clay is extremely susceptible to hydration. When bentonite clay becomes hydrated its volume expands greatly as it absorbs more and more water between the plates of its structure. A corresponding increase in fluid viscosity accompanies this hydration. One way to measure the hydration suppression characteristics of an inhibitor is to compare the viscosity of a fluid containing bentonite and an inhibitor to a fluid with just bentonite.

To determine the performance of PEI HCl salt as a shale inhibitor, hydration suppression tests were performed using water, bentonite and increasing concentrations of PEI HCl salt. The additives, their concentrations and order of mixing is given in Table 1. After mixing the additives, the aqueous bentonite dispersions were hot rolled at 150° F. (66° C.) for 16 hours. After hot rolling, the rheology of the dispersions was measured at 120° F. (49° C.) with the results shown in Table 1.

TABLE 1

Hydration suppression tests of PEI hydrochloride salt shale inhibitor

| Additive | Mix time | Fluid 1 | Fluid 2 | Fluid 3 | Fluid 4 |
|---|---|---|---|---|---|
| Water, g | | 350 | 350 | 350 | 350 |
| E-100 salt, g | 5 | 0 | 1 | 5 | 10 |
| API Bentonite, g | 20 | 30 | 30 | 30 | 30 |
| Rheology, 120° F. (49° C.) | | | | | |
| 600 | | 121 | 42 | 19 | 6 |
| 300 | | 86 | 28 | 15 | 3 |

TABLE 1-continued

Hydration suppression tests of PEI hydrochloride salt shale inhibitor

| Additive | Mix time | Fluid 1 | Fluid 2 | Fluid 3 | Fluid 4 |
|---|---|---|---|---|---|
| 200 | | 72 | 21 | 13 | 2 |
| 100 | | 52 | 14 | 11 | 2 |
| 6 | | 12 | 5 | 7 | 0 |
| 3 | | 9 | 4 | 7 | 0 |
| PV, centipoise (cp) | | 35 | 14 | 4 | 3 |
| YP, lbs./100 ft$^2$ (0.049 kg/m$^2$) | | 51 | 14 | 11 | 0 |
| 10 sec Gel strength, lbs./100 ft$^2$ (0.049 kg/m$^2$) | | 9 | 8 | 7 | 1 |
| 10 min Gel strength, lbs./100 ft$^2$ (0.049 kg/m$^2$) | | 28 | 17 | 9 | 2 |

Figure 5:
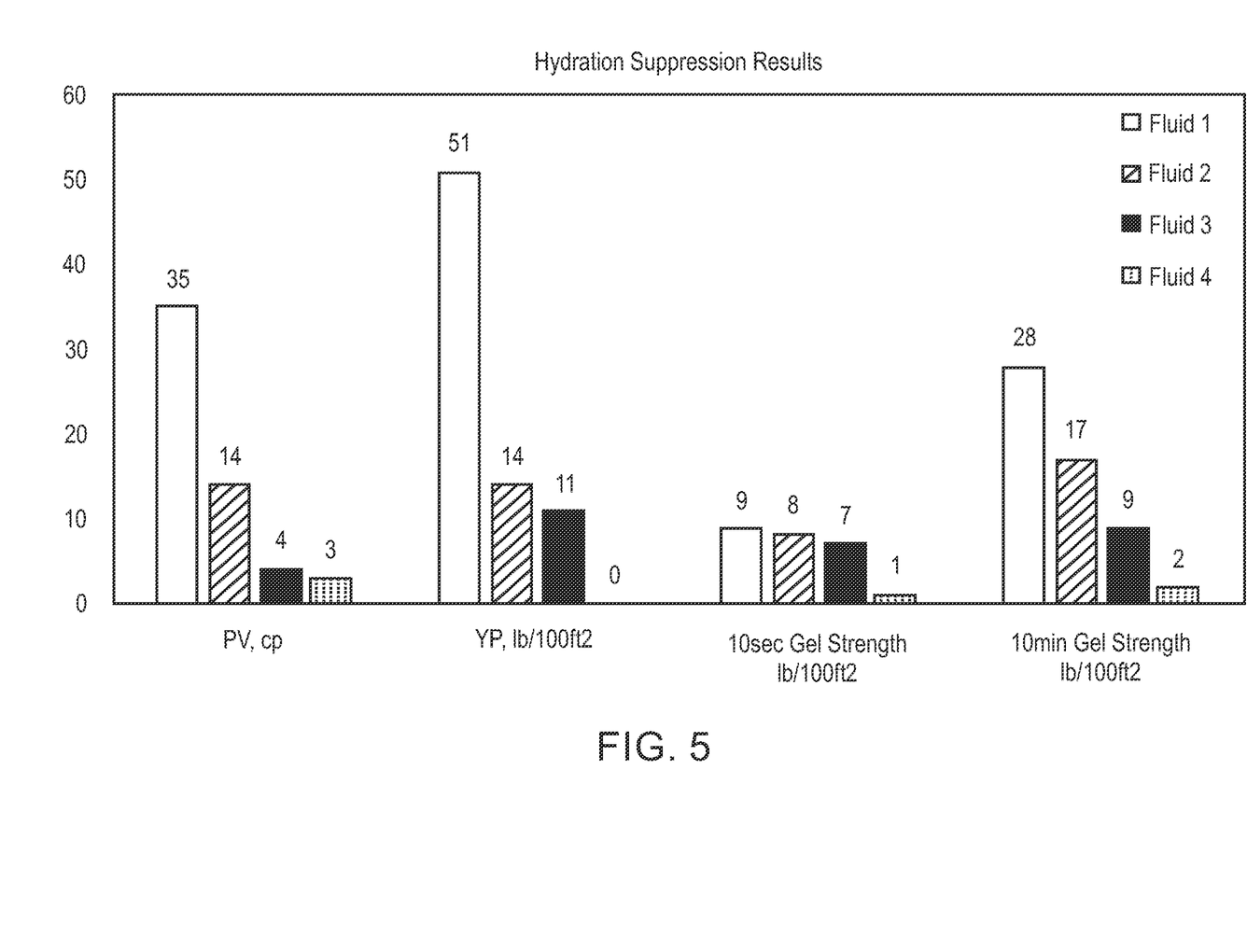
FIG. 5 is a plot showing the effects of different concentrations PEI HCl salts on the rheological properties of bentonite water dispersions.

In the absence of the PEI HCl salt, as shown for Fluid 1, the bentonite dispersion showed a YP value of 51 at 120° F. (49° C.). However, addition of the PEI HCl salt to the dispersions suppresses the hydration of bentonite in water thereby resulting in lower YP values, as shown for Fluids 2, 3, and 4. FIG. 5 is a plot showing the effects of different concentrations PEI HCl salts on the rheological properties of bentonite water dispersions at 120° F. (49° C.). These hydration tests therefore show that PEI HCl salt can be an effective shale inhibitor when used in cement slurries.

Shale Erosion Tests

The shale-erosion test is used to measure the dispersive effect that a mud will have on a specific type of shale. The following procedures were used for the shale erosion tests.

Cement Spacer Formulation:

Two different spacers were formulated. Table 1 gives the formulation of two spacers with the conventional KCl shale inhibitor and E-100 salt respectively. DF-3, WG-1, WW-2000 and MS-1 are commercial additives sold by Taqa Sanjel of Dahran, Saudi Arabia.

TABLE 2 gives the formulation of two cement spacer formulations

| Additive | Function | Spacer 1, g | Spacer 2, g |
|---|---|---|---|
| Water | | 379.3 | 379.3 |
| DF-3 | Defoamer | 4.3 | 4.3 |
| KCL | Shale inhibitor | 19 | — |
| E 100 salt | Shale inhibitor | — | 19 |
| WG-1 | Viscosifier | 2.9 | 2.9 |
| Barite | Weighting agent | 604.7 | 604.7 |
| WW-2000 | surfactant | 26.8 | 26.8 |
| MS-1 | Mutual Solvent | 38.5 | 38.5 |

Mixing the Spacer Fluids

The mixing procedure to formulate the spacer fluids was performed by adding defoamer to the water while stirring at 1000 rpm, for example, using a lab mixer. The shale inhibitor, either KCl or the PEI HCl salt, was then added while stirring at 1000 rpm for two minutes. The speed of the mixer was raised to develop a vortex without entraining air. The viscosifier, WG-1, was added stepwise to prevent the formation of small gels, termed fisheyes. The WG-1 was allowed to hydrate for 20 to 30 minutes, while the mixer speed was adjusted to prevent closure of the vortex. The mixer speed was then adjusted to the minimum speed to keep a vortex, and the barite was then added. The surfactant, WW-2000, was then added, and the mixture was stirred for five minutes. The mutual solvent, MS-1, was then added and the mixture was stirred for five more minutes.

Shale Erosion Test Procedure

Cuttings were prepared using shale from the Qusaiba formation of central Saudi Arabia. The cuttings were sized by passing through a 4 mesh sieve and retained on a 5 mesh sieve. A 350 mL aliquot of the cement spacer fluid was added to a hot rolling cell and 20 grams of the sized shale were added with the cement filtrate. The hot rolling cell was hot rolled at 150° F. (66° C.) for 16 hours.

After the hot rolling was completed, the shale cuttings were recovered by pouring the cement space fluid from the hot rolling cell onto the 5 mesh sieve. The cuttings were then carefully washed with 5% w/w KCl brine, and removed from the sieve. The samples were placed in an oven at 105° C. (221° F.), and left overnight to dry. The dried samples were weighed, and the % recovery was calculated based on sample recovered:

% shale recovery=(weight of recovered shale cuttings/20)*100

The results for the shale erosion tests are given in Table 3.

TABLE 3

Shale erosion test results

| Fluids | Shale recovery % |
|---|---|
| Spacer without any shale inhibitor | 38.2 |
| Spacer with KCl | 63.1 |
| Spacer with E-100 salt | 73.5 |

The results showed that the cement spacer fluid with the PEI HCl salt gave better shale recovery as compared to the cement slurry formulated with the conventional KCl shale inhibitor.

Embodiments

An embodiment described in examples herein provides a method for cementing in a wellbore. The method includes making a cement spacer fluid by reacting a polyethyleneimine (PEI) with hydrochloric acid to form a polyethyleneimine hydrochloride (PEI HCl) salt, dissolving the PEI HCl salt in water to form a PEI HCl salt solution, and forming the cement spacer fluid from the PEI HCl salt solution. A cement slurry is then made. The cement spacer fluid is injected in a wellbore. The cement slurry is injected in the wellbore and allowed to set.

In an aspect, the method includes reacting the PEI with a stoichiometric amount of concentrated hydrochloric acid.

In an aspect, the method includes making the cement slurry by mixing the PEI HCl salt solution with cement to form the cement slurry.

In an aspect, the method includes mixing a viscosifier into the PEI HCl salt solution to form a thickened fluid.

In an aspect, the method includes mixing a weighting agent into the thickened fluid. In an aspect, the method includes forming the cement spacer fluid from the thickened fluid.

In an aspect, the method includes adding potassium chloride to the cement slurry.

In an aspect, the method includes injecting a displacement fluid after the cement slurry.

In an aspect, the method includes placing a wiper plug in the wellbore after the cement slurry and before a displacement fluid.

Another embodiment described in examples herein provides a cement spacer fluid for cementing a wellbore. The cement spacer fluid includes a polyethyleneimine hydrochloride (PEI HCl) salt, an aqueous solvent, a viscosifier, and a weighting agent.

In an aspect, the cement spacer fluid includes between about 0.5 wt. % of the PEI HCl salt and about 25 wt. % of the PEI HCl salt.

In an aspect, the cement spacer fluid includes between about 0.1 wt. % of the viscosifier and about 10 wt. % of the viscosifier.

In an aspect, the cement spacer fluid includes between about 0.1 wt. % of the weighting agent and about 80 wt. % of the weighting agent.

In an aspect, the cement spacer fluid includes a defoaming agent.

In an aspect, the PEI HCl salt includes a compound with the structural formula:

wherein x is between 1 and 100. In an aspect, x is 3, 4, or 5. In an aspect, the PEI HCl salt includes linear, branched, or cyclic chains, or any combinations thereof. In an aspect, the PEI HCl salt is formed from a PEI including any one of the following structures:

Another embodiment described in examples herein provides a method for making a cement spacer fluid composition. The method includes reacting a polyethyleneimine (PEI) with hydrochloric acid to form a polyethyleneimine hydrochloride (PEI HCl) salt, dissolving the PEI HCl salt in water to form a PEI HCl salt solution, mixing the PEI HCl salt solution with a viscosifier to form a thickened solution, and mixing the thickened solution with a weighting agent.

In an aspect, the method includes adding a defoamer to the water before adding the PEI HCl salt.

Other implementations are also within the scope of the following claims.

What is claimed is:

1. A method for cementing in a wellbore, comprising:
   making a cement spacer fluid by:
      reacting a polyethyleneimine (PEI) with hydrochloric acid to form a polyethyleneimine hydrochloride (PEI HCl) salt;
      dissolving the PEI HCl salt in water to form a PEI HCl salt solution; and
      forming the cement spacer fluid from the PEI HCl salt solution;
   making a cement slurry;
   injecting the cement spacer fluid in a wellbore;
   injecting the cement slurry in the wellbore; and
   allowing the cement slurry to set.

2. The method of claim 1, comprising reacting the PEI with a stoichiometric amount of hydrochloric acid.

3. The method of claim 1, comprising making the cement slurry by mixing the PEI HCl salt solution with cement to form the cement slurry.

4. The method of claim 1, comprising mixing a viscosifier into the PEI HCl salt solution to form a thickened fluid.

5. The method of claim 4, comprising mixing a weighting agent into the thickened fluid.

6. The method of claim 5, comprising forming the cement spacer fluid from the thickened fluid.

7. The method of claim 1, comprising adding potassium chloride to the cement slurry.

8. The method of claim 1, comprising injecting a displacement fluid after the cement slurry.

9. The method of claim 1, comprising placing a wiper plug in the wellbore after the cement slurry and before a displacement fluid.

10. A method for making a cement spacer fluid composition, comprising:
    reacting a polyethyleneimine (PEI) with hydrochloric acid to form a polyethyleneimine hydrochloride (PEI HCl) salt;
    dissolving the PEI HCl salt in water to form a PEI HCl salt solution;
    mixing the PEI HCl salt solution with a viscosifier to form a thickened solution; and
    mixing the thickened solution with a weighting agent.

11. The method of claim 10, comprising adding a defoamer to the water before adding the PEI HCl salt.

* * * * *